United States Patent Office 2,849,396
Patented Aug. 26, 1958

2,849,396

SELECTIVE SOLVENT

William T. Nelson, Bartlesville, Okla., assignor to Phillips Petroleum Company, a corporation of Delaware No Drawing. Application June 29, 1953
Serial No. 364,920

27 Claims. (Cl. 252—1)

This invention relates to a novel selective solvent for hydrocarbons. In one aspect this invention relates to a novel selective solvent for the separation of different hydrocarbons having similar boiling points. In another aspect, it relates to a solvent for the separation of hydrocarbons having different carbon to hydrogen ratios. In one of its more specific aspects, it relates to a novel selective solvent for the removal of acetylene from a gaseous hydrocarbon mixture containing a minor portion of acetylene. In another of its more specific aspects, it relates to a method for the recovery of acetylene contained as a minor constituent in a gaseous hydrocarbon mixture.

Acetylene may be produced by thermal treatment of hydrocarbons by a variety of methods. Among such methods are the treatment of hydrocarbons of the methane and ethylene series by controlled pyrolysis, passage of such hydrocarbons through an electric arc, incomplete combustion, and the like.

Acetylene is formed as a minor constituent in refinery streams resulting from cracking, dehydrogenation and other similar reactions involving thermal or catalytic treatment of hydrocarbon fractions or petroleum derivatives. These gaseous streams usually contain a relatively small percentage of acetylene as compared to the other constituents which may be present, such as hydrogen, methane, ethylene, ethane, nitrogen, or the like. A major problem arises in the separation of the several constituents of such gaseous mixtures and particularly the concentration and/or separation of acetylene.

For the recovery of acetylene from gaseous mixtures, the selective solvent action of various compounds and mixtures of compounds have been used. The most commonly employed solvent is acetone; however, other solvents such as the dialkyl formamides, the aliphatic lactones, the esters of polyhydric alcohols, the polyketones, and the like have been either proposed or used. An ideal solvent for acetylene should have the properties of high solubility for acetylene, high selectivity for acetylene over the other constituents of the gaseous mixture, high boiling point, high thermal stability, low vapor pressure at ordinary temperatures and absence of chemical reaction with acetylene or other constituents of the gaseous stream. Although the compounds heretofore suggested for this purpose accomplish acetylene removal and recovery, they do not, in each case, possess all of the above properties and thus there is considerable room for improvement.

A liquid having high solvent power for acetylene is also important in the storage of acetylene in pressure retaining vessels. Acetylene is commonly stored in pressure containers which are partially filled with balsa wood or other absorbent and porous material into which the solvent containing dissolved acetylene is introduced under pressure. The higher the solvent power of the solvent used, the larger is the volume of acetylene which may be introduced in the container at a stated pressure, and solvents of high solvent power are therefore desirable.

The separation of hydrocarbons having similar boiling points presents a problem. Superfractionation has recently been employed in some of these difficult separations; however, this is usually an expensive process. Fractional crystallization offers another method for the separation of close boiling hydrocarbons although this method is likewise expensive and is time consuming. Another method for such separations is that of solvent extraction or extractive distillation and the possibilities afforded by the use of a selective solvent appear to be limited only by the selectivity and capacity of such solvent and the availability and cost of such solvent.

Solvent extraction and extractive distillation methods are applicable to the separation of unsaturated hydrocarbons from less unsaturated hydrocarbons such as acetylenes from diolefins, diolefins from olefins, olefins from paraffins, and various combinations of the above hydrocarbon types. The use of solvents is also applicable in the separation of cycloparaffins (referred to in the petroleum industry as naphthenes), from the acrylic paraffins.

In at least one modification of this invention, at least one of the following objects is attained.

It is an object of this invention to provide a selective solvent for acetylene.

Another object is to provide a method for the separation of unsaturated hydrocarbons from less unsaturated hydrocarbons.

Another object is to provide a method for the selective removal and recovery of acetylene from gaseous mixtures.

Another object is to provide a method for the separation of hydrocarbons having similar boiling points.

Another object is to provide a new composition of matter consisting of acetylene dissolved in a novel solvent.

It is still another object to provide a selective solvent for unsaturated hydrocarbons in the presence of less unsaturated hydrocarbons.

It is still another object to provide an improved method for storage of acetylene.

Other objects will be apparent to one skilled in the art upon reading this disclosure of the invention.

I have discovered that N-alkyl-2-pyridones are effective selective solvents for the separation of hydrocarbons having different carbon to hydrogen ratios but having similar boiling points. The N-alkyl-2-pyridones of this invention are particularly effective selective solvents for the separation of acetylene from gaseous mixtures containing acetylene. The N-alkyl-2-pyridones are also effective selective solvents for the separation of naphthene hydrocarbons such as cyclohexane from the paraffin hydrocarbons having similar boiling points, for example, 2,2-dimethyl pentane and 2-4-dimethyl pentane, and the separation of aromatics from naphthenes and paraffins.

The solubilities of acetylene and other gaseous constituents in N-methyl-2-pyridone are given in Table I.

TABLE I

| Solvent | At 30° C. | | | | At 0° C. | | | |
|---|---|---|---|---|---|---|---|---|
| | $C_2H_2$ | $C_2H_4$ | $CO_2$ | $N_2$ | $C_2H_2$ | $C_2H_4$ | $CO_2$ | $N_2$ |
| N-methyl-2-pyridone | 12.0 | 0.92 | 1.83 | ~0.10 | 29.1 | 1.44 | 3.42 | ~0.10 |
| Acetone | 16.4 | 3.00 | 4.1 | | | | | |

These solubilities are expressed in terms of the Bunsen coefficient, alpha ($\alpha$), which is defined as the number of milliliters of solute gas, calculated at 760 millimeters of pressure and 0° C., dissolved per milliliter of solvent at one atmosphere partial pressure of solute gas. The selectivities (ratio of solubilities) of N-methyl-2-pyridone for acetylene over ethylene and for acetylene over carbon dioxide are given in Table II.

TABLE II

| Solvent | At 30° C. | | At 0° C. | |
| --- | --- | --- | --- | --- |
| | $\alpha C_2H_2/\alpha C_2H_4$ | $\alpha C_2H_2/\alpha CO_2$ | $\alpha C_2H_2/\alpha C_2H_4$ | $\alpha C_2H_2/\alpha CO_2$ |
| N-methyl-2-pyridone | 13.0 | 6.6 | 20.2 | 8.5 |
| Acetone | 5.5 | 4.0 | | |

Data showing the selectivities of N-methyl-2-pyridone for benzene over n-heptane and for cyclohexane over n-heptane are presented in Table III.

TABLE III

| | Charge, vol. percent | Extract, vol. percent (75.5%) | Raffinate, vol. percent (24.5%) |
| --- | --- | --- | --- |
| $t=24.5°$ C.: | | | |
| Benzene | 25.0 | 25.3 | 22.8 |
| N-heptane | 25.0 | 9.8 | 73.1 |
| Solvent | 50.0 | 64.9 | 4.1 |
| | 100.0 | 100.0 | 100.0 |
| | | (47.8%) | (52.2%) |
| $t=25°$ C: | | | |
| Cyclohexane | 27.8 | 5.1 | 47.4 |
| N-heptane | 27.8 | 3.0 | 51.5 |
| Solvent | 44.4 | 91.9 | 1.1 |
| | 100.0 | 100.0 | 100.0 |

The data in Tables I, II, and III were obtained at atmospheric pressure and the indicated temperatures.

The novel solvents of my invention possess physical properties which make them very useful as solvent for acetylene. Some of these properties are given in Table IV.

TABLE IV
*Properties of solvents*

| Solvent | N-methyl-2-pyridone | N-ethyl-2-pyridone | N-isopropyl-2-pyridone |
| --- | --- | --- | --- |
| Molecular weight | 109 | 123 | 137. |
| Boiling point, ° C. | 250 | 249–250 | 145–150 (at 15 mm. Hg). |
| Vapor pressure, at 30° C., mm. | 1 | 1 | |
| Freezing point, ° C. | | | |

In an acetylene recovery process, the acetylene-containing effluent stream is subjected to countercurrent scrubbing in any suitable absorbent tower, such as a spray, packed, or bubble plate tower. The solvent need not be a pure compound and may be admixed with other acetylene solvents or liquid materials which have no selective solvent action on acetylene. The temperatures and pressures employed may vary over wide limits but very often ordinary temperatures and pressures are used. It is preferred to operate at a temperature substantially below the boiling point of the solvent and above the dew-point of the gaseous mixture at the existing pressure. At very low temperatures, for a fixed pressure, the solubility of acetylene is increased, but the solubility for other gases may be so great that lower selectivity is obtained; whereas, at high temperatures so little acetylene may be dissolved, that selectivity is of little consequence. The use of super-atmospheric pressure improves the capacity of the solvent for acetylene but requires more expensive equipment. The acetylene selectively absorbed in the solvent along with small amounts of other gases is recovered by either heating the solution to expel the gas, reducing the pressure over the solution to effect a separation of the dissolved gas, or by using a combination of both features. Thereafter, the solvent is recirculated in the system.

The N-alkyl-2-pyridones applicable in the practice of my invention are those wherein the alkyl radical contains less than 5 carbon atoms. I prefer to use N-methyl-2-pyridone and N-ethyl-2-pyridone; however, the propyl and butyl derivatives can also be used.

The naphthenes which can be separated from mixtures of naphthenes and paraffins include cyclopentane, cyclobutane, methylcyclopentane, ethylcyclopentane, methylethylcyclopentane, methylcyclohexane, ethylcyclohexane, methylethylcyclohexane, cycloheptane, and the like. The aromatics which can be separated from mixtures of hydrocarbons containing aromatics include toluene, ethylbenzene, xylenes, isopropyl benzene, tert-butyl benzene, and the like. Olefins such as ethylene, propylene, butene, etc. can be separated from paraffins by the practice of this invention.

I prefer the practice of the separation process of my invention upon gaseous hydrocarbons; however, the invention is also applicable to liquid hydrocarbons. In the separation of liquid hydrocarbons having similar boiling points, known solvent extraction and/or extractive distillation processes can be employed.

Variations and modifications are possible within the scope of the disclosure of the present invention, the essence of which is that N-alkyl-2-pyridones have been discovered to be effective selective solvents for separating hydrocarbons having different carbon to hydrogen ratios and particularly for separating acetylene from olefins and paraffins.

I claim:

1. The process of separating an unsaturated hydrocarbon selected from the group consisting of acetylenes, aromatic hydrocarbons, and naphthene hydrocarbons from a less unsaturated hydrocarbon selected from the group consisting of olefins, aromatic hydrocarbons, naphthene hydrocarbons, and paraffin hydrocarbons which comprises contacting said hydrocarbons with a N-alkyl-2-pyridone having less than 5 carbon atoms in the alkyl radical and separating said N-alkyl-2-pyridone containing dissolved unsaturated hydrocarbon from the remaining less unsaturated hydrocarbon.

2. The process of claim 1 wherein the unsaturated hydrocarbon is acetylene and the less unsaturated hydrocarbon comprises ethylene, ethane, and methane in a gaseous mixture.

3. The process of claim 1 wherein the unsaturated hydrocarbon is an olefin and the less unsaturated hydrocarbon comprises paraffins and naphthenes.

4. The process of claim 1 wherein the N-alkyl-2-pyridone is N-methyl-2-pyridone.

5. The process of claim 1 wherein the N-alkyl-2-pyridone is N-ethyl-2-pyridone.

6. The process of claim 1 wherein the N-alkyl-2-pyridone is N-isopropyl-2-pyridone.

7. The process of claim 3 wherein the olefin is ethylene.

8. The process of removing acetylene from the gaseous effluent of a hydrocarbon reaction process wherein acetylene is present as a minor constituent which comprises contacting said gaseous effluent with a N-alkyl-2-pyridone having less than 5 carbon atoms in the alkyl radical.

9. A composition of matter which consists essentially of acetylene dissolved in a N-alkyl-2-pyridone having less than 5 carbon atoms in the alkyl radical.

10. The composition of claim 9 wherein the N-alkyl-2-pyridone is N-methyl-2-pyridone.

11. The composition of claim 9 wherein the N-alkyl-2-pyridone is N-ethyl-2-pyridone.

12. The composition of claim 9 wherein the N-alkyl-2-pyridone is N-isopropyl-2-pyridone.

13. A package which comprises a pressure resistant container, an adsorbent material, a N-alkyl-2-pyridone having less than 5 carbon atoms in the alkyl radical, and acetylene.

14. The package of claim 13 wherein the N-alkyl-2-pyridone is N-methyl-2-pyridone.

15. The package of claim 13 wherein the N-alkyl-2-pyridone is N-ethyl-2-pyridone.

16. The package of claim 13 wherein the N-alkyl-2-pyridone is N-isopropyl-2-pyridone.

17. A method for the storage of acetylene which comprises dissolving acetylene in a N-alkyl-2-pyridone having less than 5 carbon atoms in the alkyl radical and confining a resulting solution in a storage zone.

18. The process of purifying an ethylene stream containing acetylene as an impurity which comprises contacting said ethylene stream in the gaseous phase with a N-alkyl-2-pyridone having less than 5 carbon atoms in the alkyl radical.

19. The process of removing aromatic hydrocarbons from a hydrocarbon mixture containing aromatic hydrocarbons which comprises contacting said mixture with a N-alkyl-2-pyridone having less than 5 carbon atoms in the alkyl radical and removing said N-alkyl-2-pyridone solvent containing said aromatic hydrocarbon dissolved therein.

20. The process of separating naphthene hydrocarbons from a mixture containing naphthene hydrocarbons and paraffin hydrocarbons which comprises contacting said mixture with a N-alkyl-2-pyridone having less than 5 carbon atoms in the alkyl radical and removing said N-alkyl-2-pyridone solvent containing naphthene hydrocarbon dissolved therein.

21. The process of claim 19 wherein the N-alkyl-2-pyridone is N-methyl-2-pyridone.

22. The process of claim 19 wherein the N-alkyl-2-pyridone is N-ethyl-2-pyridone.

23. The process of claim 19 wherein the N-alkyl-2-pyridone is N-isopropyl-2-pyridone.

24. The process of claim 20 wherein the N-alkyl-2-pyridone is N-methyl-2-pyridone.

25. The process of claim 20 wherein the N-alkyl-2-pyridone is N-ethyl-2-pyridone.

26. The process of claim 20 wherein the N-alkyl-2-pyridone is N-isopropyl-2-pyridone.

27. The process of removing acetylene from a gaseous mixture containing acetylene and carbon dioxide which comprises contacting said mixture with an N-alkyl-2-pyridone having less than 5 carbon atoms in the alkyl radical.

References Cited in the file of this patent

UNITED STATES PATENTS

| | | |
|---|---|---|
| 2,405,693 | Hamill et al. | Aug. 13, 1946 |
| 2,431,675 | Bour | Dec. 2, 1947 |
| 2,599,649 | Lorenz | June 10, 1952 |
| 2,664,997 | Eck | Jan. 5, 1954 |

UNITED STATES PATENT OFFICE

CERTIFICATE OF CORRECTION

Patent No. 2,849,396                                              August 26, 1958

William T. Nelson

It is hereby certified that error appears in the printed specification of the above numbered patent requiring correction and that the said Letters Patent should read as corrected below.

Column 2, line 20, for "acrylic" read -- acyclic --.

Signed and sealed this 27th day of January 1959.

(SEAL)

Attest:

KARL H. AXLINE                                                 ROBERT C. WATSON
Attesting Officer                                         Commissioner of Patents